United States Patent
Liu et al.

(10) Patent No.: US 12,556,022 B2
(45) Date of Patent: Feb. 17, 2026

(54) CHARGING METHOD AND APPARATUS, VEHICLE, AND COMPUTER-READABLE STORAGE MEDIUM

(71) Applicant: CONTEMPORARY AMPEREX TECHNOLOGY (HONG KONG) LIMITED, Hong Kong (CN)

(72) Inventors: Sitong Liu, Ningde (CN); Dongyang Shi, Ningde (CN); Shichao Li, Ningde (CN); Baiqing Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 918 days.

(21) Appl. No.: 17/831,362

(22) Filed: Jun. 2, 2022

(65) Prior Publication Data

US 2023/0034272 A1 Feb. 2, 2023

Related U.S. Application Data

(63) Continuation of application No. PCT/CN2021/109061, filed on Jul. 28, 2021.

(51) Int. Cl.
*H02J 7/00* (2006.01)
(52) U.S. Cl.
CPC ...... *H02J 7/007182* (2020.01); *H02J 7/0048* (2020.01)
(58) Field of Classification Search
CPC ........ H02J 7/0048; H02J 7/0049; H02J 7/005; H02J 7/007182

(Continued)

(56) References Cited

U.S. PATENT DOCUMENTS

2005/0242821 A1* 11/2005 Suzuki ................. H02J 7/0048
324/430
2010/0188048 A1* 7/2010 Nishino ............ H02J 7/007182
429/231.95

(Continued)

FOREIGN PATENT DOCUMENTS

CN 102148410 A 8/2011
CN 103606716 A 2/2014

(Continued)

OTHER PUBLICATIONS

The World Intellectual Property Organization (WIPO) International Search Report and Written opinion for PCT/CN2021/109061 Apr. 6, 2022 13 pages (including English translation).

(Continued)

*Primary Examiner* — Julian D Huffman
*Assistant Examiner* — Ryu-Sung P. Weinmann
(74) *Attorney, Agent, or Firm* — ANOVA LAW GROUP, PLLC

(57) ABSTRACT

This application provides a charging method and apparatus, a vehicle, and a computer-readable storage medium. The method includes: obtaining a current voltage of a target battery; determining a current capacity of the target battery based on the current voltage; determining a chargeable capacity of the target battery based on the current capacity; and obtaining a real-time voltage of the target battery where the target battery is charged with the chargeable capacity, where the real-time voltage is used for determining a charge cut-off voltage of the target battery in a next charging.

11 Claims, 10 Drawing Sheets

(58) Field of Classification Search
USPC .......................................................... 320/124
See application file for complete search history.

(56) References Cited

U.S. PATENT DOCUMENTS

| | | | |
|---|---|---|---|
| 2017/0093179 A1 | 3/2017 | Cho et al. | |
| 2017/0299660 A1* | 10/2017 | Saint-Marcoux | B60L 58/13 |
| 2018/0062395 A1* | 3/2018 | Aldehayyat | G06F 1/1635 |
| 2018/0090962 A1* | 3/2018 | Cha | G01R 31/3648 |
| 2018/0154778 A1* | 6/2018 | Ota | H02J 7/0068 |
| 2019/0305574 A1 | 10/2019 | Matsumura et al. | |
| 2021/0391742 A1* | 12/2021 | Guan | H01M 10/44 |
| 2023/0051221 A1* | 2/2023 | Ning | H02J 7/0048 |
| 2023/0253812 A1* | 8/2023 | Ren | H02J 7/0047 |
| | | | 320/160 |
| 2024/0136930 A1* | 4/2024 | Ebenezer | G01R 31/389 |

FOREIGN PATENT DOCUMENTS

| | | | | |
|---|---|---|---|---|
| CN | 105071449 A | 11/2015 | | |
| CN | 107024657 A | 8/2017 | | |
| CN | 110758127 A | 2/2020 | | |
| EP | 3281274 A1 | 2/2018 | | |
| JP | 2000251948 A | 9/2000 | | |
| WO | WO-2021077273 A1 * | 4/2021 | .......... | H02J 7/00712 |

OTHER PUBLICATIONS

The European Patent Office (EPO) Extended Search Report for EP Application No. 21912305.6 Jun. 30, 2023 9 Pages.

* cited by examiner

231

Determine a current state of charge of a target battery based on a current voltage and a correspondence between voltages and states of charge of a target battery — 231

Determine a current capacity of the target battery based on the current state of the charge and a design capacity of the target battery — 232

CHARGING METHOD AND APPARATUS, VEHICLE, AND COMPUTER-READABLE STORAGE MEDIUM

CROSS-REFERENCE TO RELATED APPLICATION

This application is a continuation application of PCT Patent Application No. PCT/CN2021/109061, entitled "CHARGING METHOD, APPARATUS, VEHICLE AND COMPUTER-READABLE STORAGE MEDIUM" filed on Jul. 28, 2021, which is incorporated herein by reference in its entirety.

TECHNICAL FIELD

This application relates to the field of charging technologies, and specifically to, a charging method and apparatus, a vehicle, and a computer-readable storage medium.

BACKGROUND

As the time in use of a battery increases, aging and polarization of the battery may be aggravated, and a chargeable capacity of the battery will gradually decline, resulting in a shorter usable time of the battery.

SUMMARY

In view of this, embodiments of this application are intended to provide a charging method and apparatus, a vehicle, and a computer-readable storage medium, which can alleviate the problem of declining of charge capacity due to aging of a battery.

According to a first aspect, an embodiment of this application provides a charging method, including:
  obtaining a current voltage of a target battery:
  determining a current capacity of the target battery based on the current voltage;
  determining a chargeable capacity of the target battery based on the current capacity; and
  obtaining a real-time voltage where the target battery is charged with the chargeable capacity, where the real-time voltage is used for determining a charge cut-off voltage of the target battery in a next charging.

In an embodiment, the determining a current capacity of the target battery based on the current voltage includes:
  determining the current state of charge of the target battery based on the current voltage and a correspondence between voltages and states of charge of the target battery; and
  determining the current capacity of the target battery based on the current state of charge and a design capacity of the target battery.

In an embodiment, the determining a chargeable capacity of the target battery based on the current capacity includes:
  determining the chargeable capacity of the target battery based on the design capacity and the current capacity of the target battery.

In an embodiment, that the obtaining a real-time voltage where the target battery is charged with the chargeable capacity includes:
  obtaining current data of the target battery in a charging process:
  determining a charged capacity of the target battery based on the current data and a charging duration; and
  obtaining the real-time voltage where the charged capacity of the target battery reaches the chargeable capacity.

In an embodiment, the determining a current capacity of the target battery based on the current voltage includes:
  determining whether a time length between a latest update time of a current-time charge cut-off voltage and a current time is greater than a first threshold; and
  if the time length between the latest update time of the current-time charge cut-off voltage and the current time is greater than the first threshold, determining the current capacity of the target battery based on the current voltage.

In the foregoing embodiment, whether an update frequency of the target battery is too high may be determined based on the update time. If the update frequency is too high, update of the charge cut-off voltage may be skipped, and thus frequent update of a voltage upper limit of the battery may be avoided, thereby improving stability of the battery.

In an embodiment, the method further includes:
  if the current voltage is greater than a preset voltage threshold, using the charge cut-off voltage as a voltage upper limit of the target battery in a current charging, where when the current charging is a first-time charging, the charge cut-off voltage is an initially set cut-off voltage, and when the current charging is an $N^{th}$-time charging, the charge cut-off voltage is an initially set cut-off voltage, or a charge cut-off voltage determined after an $M^{th}$-time charging, where N is a positive integer greater than 1, and M is a positive integer less than N.

In an embodiment, the preset voltage threshold may be determined in the following method:
  comparing a correspondence between initial voltages and states of charge of a specified battery in a fresh state with a correspondence between aging voltages and states of charge of the specified battery being aged, to determine a critical point of change between the correspondence between initial voltages and states of charge and the correspondence between aging voltages and states of charge, where the critical point of change means that, when a voltage of the specified battery is any voltage less than the critical point of change, a difference between a first state of charge under the correspondence between initial voltages and states of charge of the specified battery and a second state of charge under the correspondence between aging voltages and states of charge of the specified battery is less than a specified numerical value, and the specified battery is a battery of the same type as the target battery; and
  determining the preset voltage threshold based on a voltage corresponding to the critical point of change.

In an embodiment, the critical point of change includes a first critical point of change and a second critical point of change, and the comparing a correspondence between initial voltages and states of charge of a specified battery in a fresh state with a correspondence between aging voltages and states of charge of the specified battery being aged, to determine a critical point of change between the correspondence between initial voltages and states of charge and the correspondence between aging voltages and states of charge includes:
  obtaining a correspondence between first-aging voltages and states of charge of the specified battery aged in a first aging mode:
  obtaining a correspondence between second-aging voltages and states of charge of the specified battery aged in a second aging mode, where the first aging mode is different from the second aging mode:

comparing the correspondence between initial voltages and states of charge of the specified battery in a fresh state with the correspondence between first-aging voltages and states of charge of the specified battery, to determine the first critical point of change between the correspondence between initial voltages and states of charge and the correspondence between first-aging voltages and states of charge; and comparing the correspondence between initial voltages and states of charge of the specified battery in a fresh state with the correspondence between second-aging voltages and states of charge of the specified battery, to determine the second critical point of change between the correspondence between initial voltages and states of charge and the correspondence between second-aging voltages and states of charge; and the determining the preset voltage threshold based on a voltage corresponding to the critical point of change includes:

determining the preset voltage threshold based on a first voltage corresponding to the first critical point of change and a second voltage corresponding to the second critical point of change.

In an embodiment, the determining the preset voltage threshold based on a first voltage corresponding to the first critical point of change and a second voltage corresponding to the second critical point of change includes:

performing weighted summation on the first voltage corresponding to the first critical point of change and the second voltage corresponding to the second critical point of change, to obtain the preset voltage threshold.

In an embodiment, the using the charge cut-off voltage as a voltage upper limit of the target battery in a current charging includes:

determining whether the time length between a latest update time of the current-time charge cut-off voltage and a current time is greater than a second threshold;

if the time length between the latest update time of the charge cut-off voltage and the current time is less than the second threshold, using the charge cut-off voltage as a voltage upper limit of the target battery in the current charging; and if the time length between the latest update time of the charge cut-off voltage and the current time is greater than the second threshold, outputting a prompt message that the charge cut-off voltage needs to be updated.

In the foregoing embodiment, through the above determining process, a prompt may be given when the cut-off voltage of the battery has not been updated for a long period, to assist the battery in updating the cut-off voltage, thereby stably updating the cut-off voltage of the battery.

In an embodiment, a ratio of a negative electrode capacity per unit area to a positive electrode capacity per unit area of the target battery is within a numerical value interval [0.8, 1.1].

In the foregoing embodiment, because the ratio of the negative electrode capacity per unit area to the positive electrode capacity per unit area of the battery is limited to reduce usage of an anode of the battery, energy density losses caused by reduction of the initial voltage upper limit may be substantially compensated for, thereby achieving a balance between a long service life and a high energy density.

According to a second aspect, an embodiment of this application provides a charging apparatus, including:

a first obtaining module, configured to obtain a current voltage of a target battery;

a first determining module, configured to determine a current capacity of the target battery based on the current voltage;

a second determining module, configured to determine a chargeable capacity of the target battery based on the current capacity; and a second obtaining module, configured to obtain a real-time voltage where the target battery is charged with the chargeable capacity, where the real-time voltage is used for determining a charge cut-off voltage of the target battery in a next charging.

According to a third aspect, an embodiment of this application provides a vehicle, including a target battery; a controller, and a memory, where the memory stores a machine-readable instruction capable of being executed by the controller; and when the target battery of the vehicle is charged, the machine-readable instruction is executed by the controller to execute the steps of the foregoing method.

According to a fourth aspect, an embodiment of this application provides a computer-readable storage medium, where the computer-readable storage medium stores a computer program, and when the computer program is run by a processor, the steps of the foregoing method are executed.

According to the charging method and apparatus, the vehicle, and the computer-readable storage medium provided in the embodiments, when the current voltage of the battery to be charged satisfies conditions, the charge cut-off voltage of the battery may be adjusted, more lithium may be released from a cathode to make up for loss of capacity, so that each charged capacity of the battery has a small change or keeps unchanged, and accordingly an ultra-long service life is achieved.

To make the foregoing objectives, features, and advantages of this application clearer and more understandable, examples are given hereinafter, and the detailed description is made as below with reference to the accompanying drawings.

BRIEF DESCRIPTION OF DRAWINGS

In order to describe the technical solutions in the embodiments of this application more clearly, the following briefly describes the accompanying drawings required for describing the embodiments. It should be appreciated that, the accompanying drawings below only show some embodiments of this application, and thus should not be considered as a limitation to the scope. A person of ordinary skill in the art may still derive other related drawings from the accompanying drawings without creative efforts.

DESCRIPTION OF EMBODIMENTS

Figure 1:
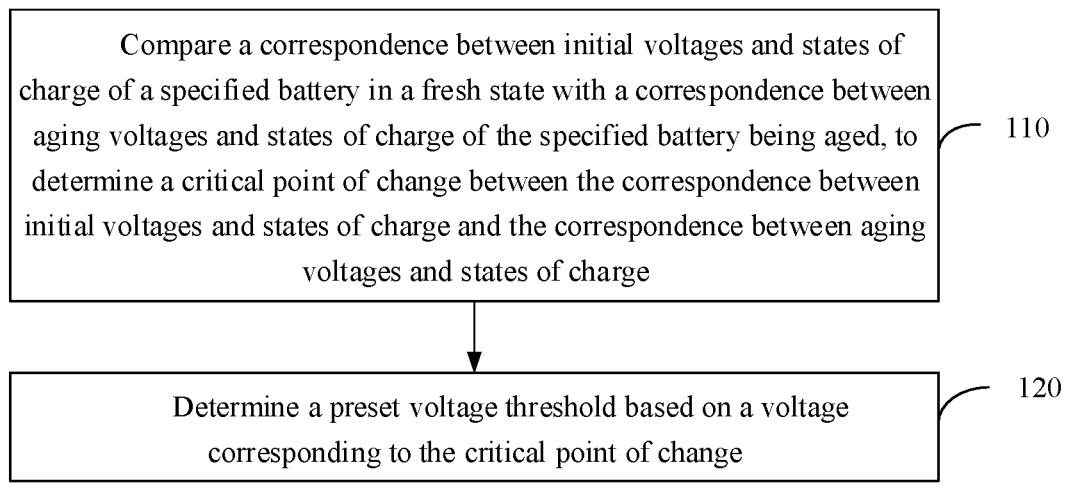
FIG. 1 is a flowchart of determining a preset voltage threshold in a charging method according to an embodiment of this application.

The following describes the technical solutions in the embodiments of this application with reference to the accompanying drawings in the embodiments of this application.

It should be noted that similar reference signs and letters indicate similar items in the following drawings, and therefore once an item is defined in one drawing, it does not need to be further defined and explained in the subsequent drawings. In addition, in the description of this application, the terms "first", "second", and the like are merely intended for distinctive description, and shall not be understood as an indication or implication of relative importance.

Aging of a battery may result in a gradual decline of a chargeable capacity of the battery. Therefore, the inventors of this application have conducted research on charging statuses of batteries based on such a situation, and learned that as the batteries age, a correspondence between voltages and states of charge of the batteries will change, and if charging is still controlled based on an initial cut-off voltage, chargeable capacity of the batteries may reduce.

Based on the above research, the embodiments of this application provide a charging method and apparatus, a vehicle, and a computer-readable storage medium. A voltage upper limit is gradually increased with use of a battery, achieving zero fading of capacity The following describes through several embodiments.

The inventors of this application have discovered in research that although a correspondence between overall voltages and states of charge of a battery may vary with aging, a correspondence between voltages and states of charge of the battery within a voltage range lower than a specified voltage threshold Vx has a small change, which can be considered that a capacity corresponding to a battery voltage within this interval does not vary with aging of the battery, meaning that a current-time remaining capacity of the battery can be relatively accurately determined based on the correspondence between voltages and states of charge within the voltage range lower than the voltage threshold Vx, and a required chargeable capacity may be calculated based on the remaining capacity of the battery. The required capacity is equal to a rated capacity minus the current remaining capacity.

However, as the battery ages, the correspondence between overall battery voltages and states of charge will change. In this case, if the remaining capacity of the battery is read based on the correspondence between initial voltages and states of charge, reading errors may result.

Therefore, the required chargeable capacity may be calculated when the voltage of the battery is less than the voltage threshold Vx, after the battery is charged with the required charged capacity; the voltage of the battery is recorded, and used as a next charge cut-off voltage, and the charge cut-off voltage is continuously increased in this way, so that zero fading of the battery capacity is realized.

Therefore, before the battery is charged, a voltage threshold corresponding to the battery may be determined first based on the correspondence between voltages and states of charge. The voltage threshold value is used for determining whether the charge cut-off voltage needs to be adjusted.

In this embodiment, as shown in FIG. 1, a preset voltage threshold may be determined through step 110 and step 120.

Step 110: Compare a correspondence between initial voltages and states of charge of a specified battery in a fresh state with a correspondence between aging voltages and states of charge of the specified battery being aged, to determine a critical point of change between the correspondence between initial voltages and states of charge and the correspondence between aging voltages and states of charge.

The fresh state indicates a state in which the battery has not aged, and the correspondence between voltages and states of charge of the battery satisfies a correspondence between initially designed voltages and states of charge of the specified battery: For example, the correspondence between initially designed voltages and states of charge of the specified battery includes: when a voltage is p1, a state of charge is 60%, and when a voltage is p2, a state of charge is 100%: then, when a current voltage of the specified battery is p1, a current-time capacity of the specified battery is 60% of a rated capacity of the specified battery, and when a current voltage of the specified battery is p2, a current-time capacity of the specified battery is 100% of the rated capacity of the specified battery.

The critical point of change means that, when the voltage of the specified battery is any voltage less than a voltage corresponding to the critical point of change, a difference between a first state of charge under the correspondence between initial voltages and states of charge of the specified battery and a second state of charge under the correspondence between aging voltages and states of charge of the specified battery is less than a specified value, and the specified battery is a battery of the same type as the target battery:

In an embodiment, correspondences between different aging voltages and states of charge that are obtained through different aging modes may be obtained. Two aging modes are used as an example. A correspondence between first-aging voltages and states of charge of the specified battery aged in a first aging mode may be obtained, and a correspondence between second-aging voltages and states of charge of the specified battery aged in a second aging mode may be obtained.

The first aging mode is different from the second aging mode.

Figure 2:
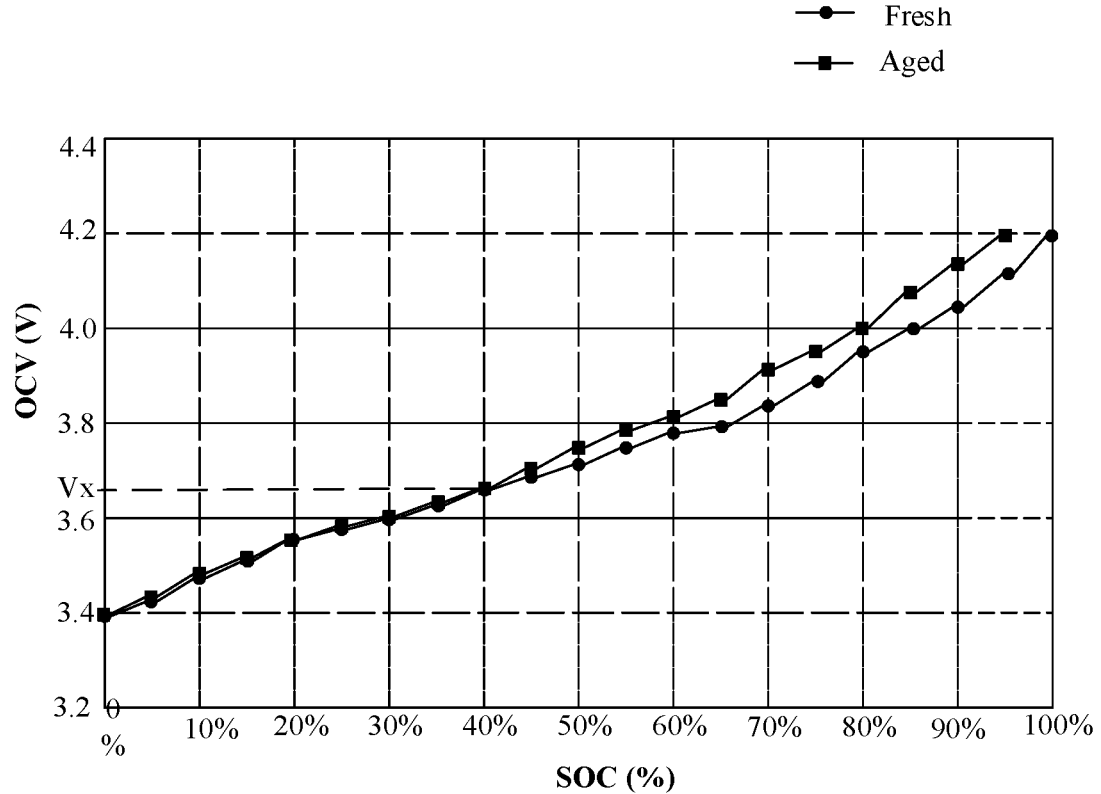
FIG. 2 is a comparison diagram of a correspondence between aging voltages and states of charge that are obtained through a first aging mode and a correspondence between initial voltages and states of charge.

In an embodiment, the first aging mode may be cycling, for example, performing 1000 cycles at 1 C/1 C at 25° C. As shown in FIG. 2, FIG. 2 is a comparison diagram of a correspondence between aging voltages and states of charge that is obtained through a first aging mode and a correspondence between initial voltages and states of charge. "Fresh" shown in FIG. 2 represents a curve of a correspondence between voltages and states of charge of a battery in a fresh state, and "Aged" in the figure represents a curve of the correspondence between aging voltages and states of charge of the battery aged in the first aging mode. In an example shown in FIG. 2, the x-coordinate represents the state of charge (State of Charge, SOC for short) of the battery, and the y-coordinate represents an open circuit voltage (Open Circuit Voltage, OCV for short) of the battery. Within a low-voltage range, curves of the correspondences between voltages and states of charge coincide substantially. As the voltages gradually increase, the curves of the correspondences between voltages and states of charge before and after aging diverge, a voltage corresponding to a diverged critical point herein is defined as a critical point of change. As shown in FIG. 2, the critical point of change between the curve of the correspondence between aging voltages and states of charge that is obtained through the first aging mode and the curve of the correspondence between voltages and states of charge is a value with a voltage ranging from 3.6 V to 3.8 V, with a state of charge being 40%. The state of charge is a ratio of a current-time capacity of the battery to a rated capacity of the battery.

The correspondence between initial voltages and states of charge of the specified battery in the fresh state is compared with the correspondence between first-aging voltages and states of charge of the specified battery, to determine the first critical point of change between the correspondence between initial voltages and states of charge and the correspondence between first-aging voltages and states of charge. In an example shown in FIG. 2, the first critical point of change may be an intersection point of the curve of the correspondence between first-aging voltages and states of charge and the curve of the correspondence between initial voltages and states of charge, or may be a point around the intersection point.

Figure 3:
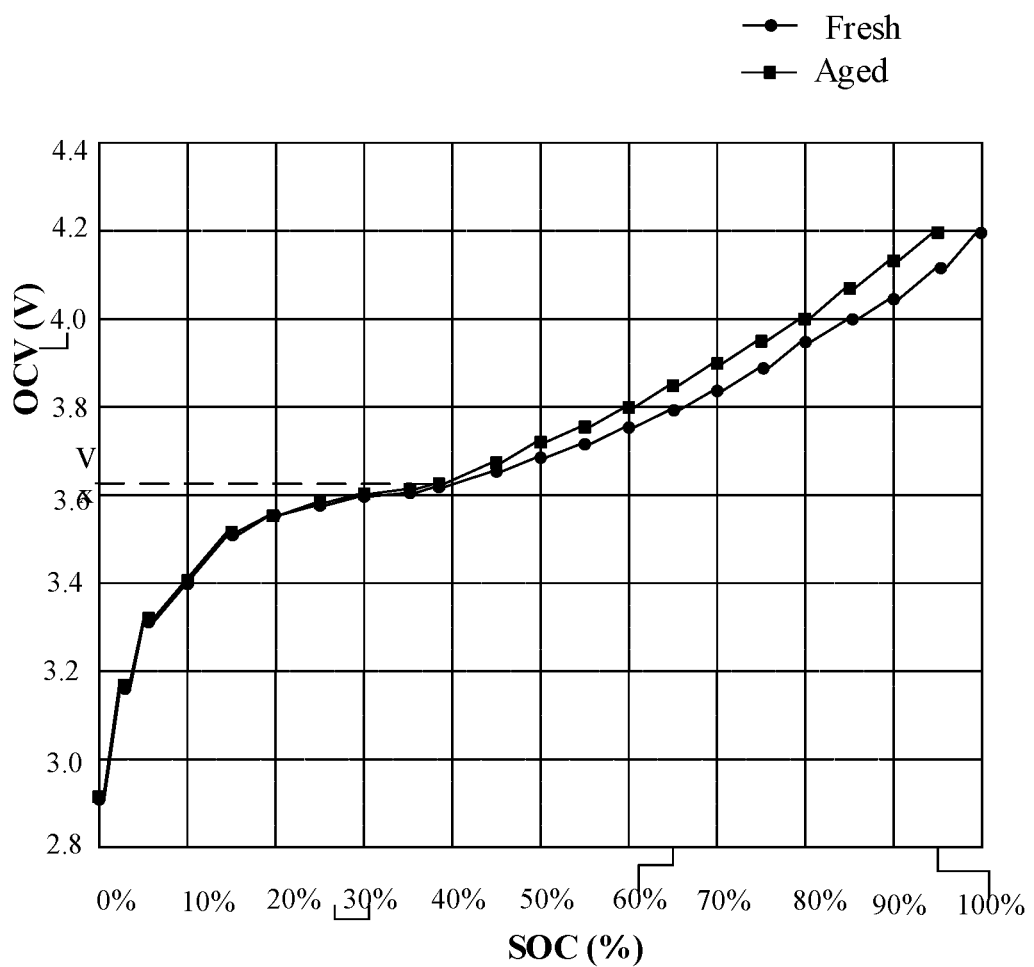
FIG. 3 is a comparison diagram of a correspondence between aging voltages and states of charge that are obtained through a second aging mode and a correspondence between initial voltages and states of charge.

In an embodiment, the second aging mode may be a storage mode, for example, storage at 60° C. for 120 days. As shown in FIG. 3, FIG. 3 is a comparison diagram of a correspondence between aging voltages and states of charge that are obtained through a second aging mode and a correspondence between initial voltages and states of charge. "Fresh" shown in the example of FIG. 3 represents a curve of a correspondence between voltages and states of charge of a battery in a fresh state, and "Aged" in the figure represents a curve of a correspondence between aging voltages and states of charge of the battery aged in the second aging mode. In an example shown in FIG. 3, the x-coordinate represents SOC of a battery, and the y-coordinate represents OCV of the battery. As shown in FIG. 3, the critical point of change between the curve of the correspondence between aging voltages and states of charge that are obtained through the second aging mode and the curve of the correspondence between voltages and states of charge refers to a value with voltage ranging from 3.6 V to 3.8 V, with a state of charge ranging from 30% to 40%.

For example, the correspondence between initial voltages and states of charge of the specified battery in the fresh state may be compared with the correspondence between second-aging voltages and states of charge of the specified battery, to determine the second critical point of change between the correspondence between initial voltages and states of charge and the correspondence between second-aging voltages and states of charge. In the example shown in FIG. 3, the second critical point of change may be an intersection point of the curve of the correspondence between second-aging voltages and states of charge and the curve of the correspondence between initial voltages and states of charge, or may be a point around the intersection point. For example, a difference between a state of charge of one point around the intersection point and a state of charge corresponding to the critical point of change is less than 3%, 2%, 2.5%, or the like.

Step 120: Determine a preset voltage threshold based on a voltage corresponding to the critical point of change.

In an embodiment, if only one critical point of change is selected, the preset voltage threshold may be equal to the voltage corresponding to the critical point of change: or the preset voltage threshold may be a specified multiple of the voltage corresponding to the critical point of change.

For example, $Vx = a \times Vp$;

where $Vx$ represents a preset voltage threshold, a represents a specified number of times, and $Vp$ represents a voltage corresponding to the critical point of change. For example, a may be a value in (0.9, 1.1).

In an embodiment, if multiple critical points of change are selected, the preset voltage threshold may be equal to the weighted sum of voltages corresponding to the multiple critical points of change.

With two critical points as an example, $Vx = a1 \times Vp1 + a2 \times Vp2$:

where $Vx$ represents a preset voltage threshold: $a1$ and $a2$ represent weights of a first voltage and a second voltage respectively: $Vp1$ may represent the first voltage corresponding to a first critical point of change; and $Vp2$ may represent the second voltage corresponding to a second critical point of change. For example, $a1 + a2 = 1$. Values of $a1$ and $a2$ may be set as required.

It can be understood that the preset voltage thresholds corresponding to different models and different materials of batteries may also be different.

Figure 4:
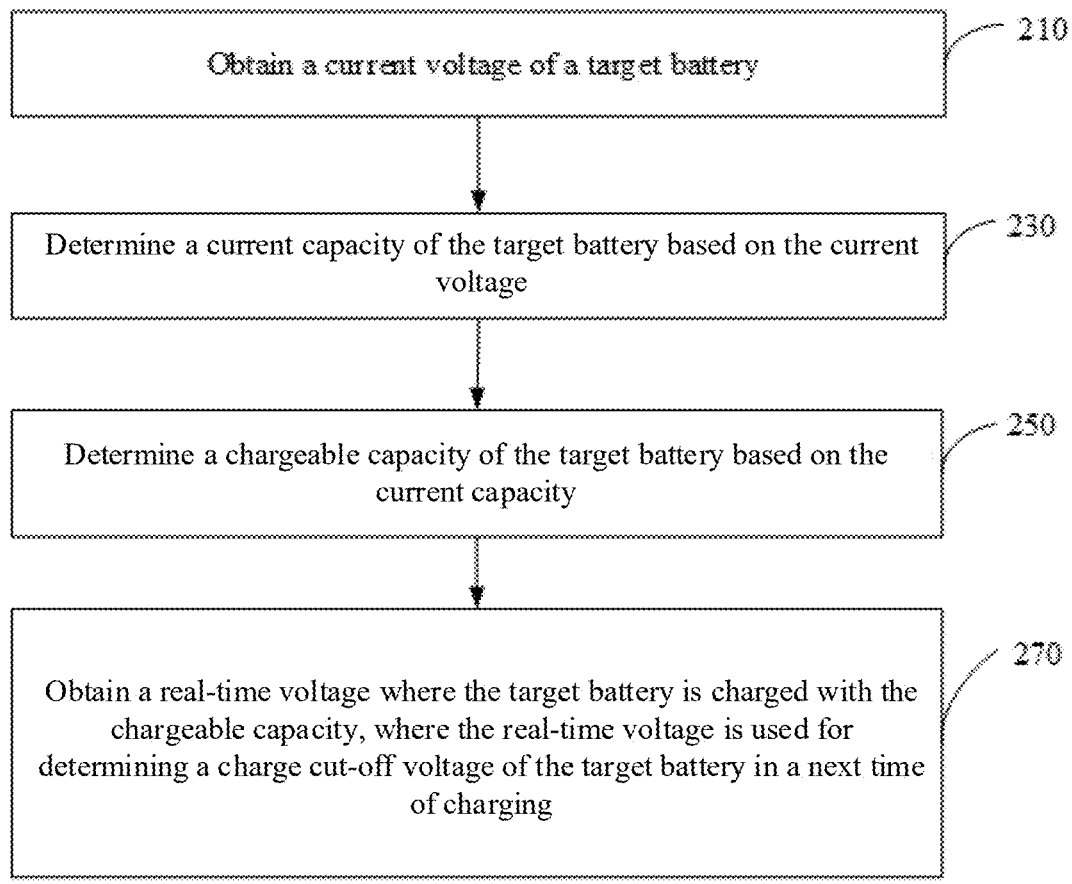
FIG. 4 is a flowchart of a charging method according to an embodiment of this application.

The charging method provided in the embodiment of this application is described below with reference to FIG. 4.

Step 210: Obtain a current voltage of a target battery.

In the embodiment, a ratio (N/P) of a negative electrode capacity per unit area and a positive electrode capacity per unit area of the target battery is within a numerical value interval [0.8, 1.1]. For example, N/P of the target battery may be set to a value such as 0.8, 0.9, 0.95, 1, 1.01, and 1.1.

In the embodiment, the step 210 may be executed when charging starts. When charging starts, a current voltage of the target battery is obtained, and the current voltage represents a voltage where the charging of the target battery starts.

Step 230: Determine a current capacity of the target battery based on the current voltage.

When the current voltage is less than the preset voltage threshold corresponding to the target battery, the step 230 is executed.

Figures 5, 6:
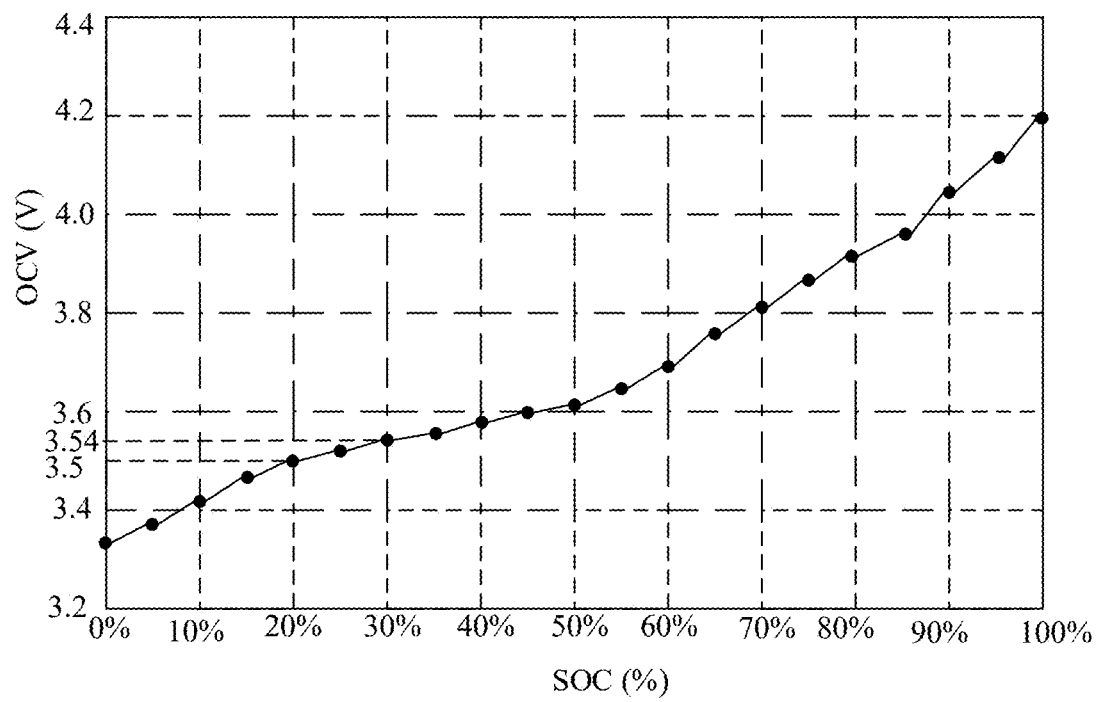
FIG. 5 is a detailed flowchart of step 230 of a charging method according to an embodiment of this application.
FIG. 6 is a curve diagram of a correspondence between voltages and states of charge in an example.

In an embodiment, as shown in FIG. 5, the current voltage of the target battery may be determined through step 231 and step 232.

Step 231: Determine a current state of charge of the target battery based on the current voltage and a correspondence between voltages and states of charge of the target battery:

For example, the correspondence between voltages and states of charge of the target battery may represent a correspondence between voltages and states of charge shown in FIG. 6, and thus the current state of charge of the target battery may be determined based on the current voltage and the correspondence between voltages and states of charge shown in FIG. 6. In FIG. 6, the x-coordinate represents SOC of the target battery, and the y-coordinate represents OCV of the target battery.

For example, if the current voltage of the target battery is 3.5, it can be determined that the current state of charge of the target battery is 20% based on the correspondence between voltages and states of charge as shown in FIG. 6. For another example, if the current voltage of the target battery is 3.54, it can be determined that the current state of charge of the target battery is 30% based on the correspondence between voltages and states of charge as shown in FIG. 6.

Step 232: Determine a current capacity of the target battery based on the current state of charge and a design capacity of the target battery.

The design capacity may represent a designed total capacity of the target battery.

In an embodiment, the value of the current state of charge may be multiplied by the design capacity to obtain the current capacity of the target battery.

For example, the current capacity of the target battery may be expressed as: C1=SOCt×C:

where C1 represents the current capacity of the target battery: C represents the design capacity of the target battery; and SOCt represents the current state of charge of the target battery.

In an embodiment, to avoid frequent update of the charge cut-off voltage of the battery; a previous update time may be determined before the update. Based on this, step 230 may include step 233 and step 234.

Step 233: Determine whether a time length between a latest update time of the current-time charge cut-off voltage and a current time is greater than a first threshold.

The first threshold may be a value set as needed. For example, if the target battery needs to be updated every three days at most, the first threshold may be set to three days. For example, if the target battery needs to be updated once a day at most, the first threshold may be set to one day. For example, if the target battery needs to be updated once a week at most, the first threshold may be set to seven days.

If the time length between the latest update time of the current-time charge cut-off voltage and the current time is greater than the first threshold, the determining a current capacity of the target battery based on the current voltage is executed.

Step 250: Determine a chargeable capacity of the target battery based on the current capacity.

The chargeable capacity of the target battery may be determined based on the design capacity and the current capacity of the target battery.

For example, the chargeable capacity of the target battery may be expressed as: C2=C−C1.

Step 270: Obtain a real-time voltage where the target battery is charged with the chargeable capacity, where the real-time voltage is used for determining a charge cut-off voltage of the target battery in a next charging.

In this embodiment, the real-time voltage of the target battery is obtained after the target battery is charged with the chargeable capacity, and the charge cut-off voltage of the target battery in a next charging is determined based on the real-time voltage.

Figure 7:
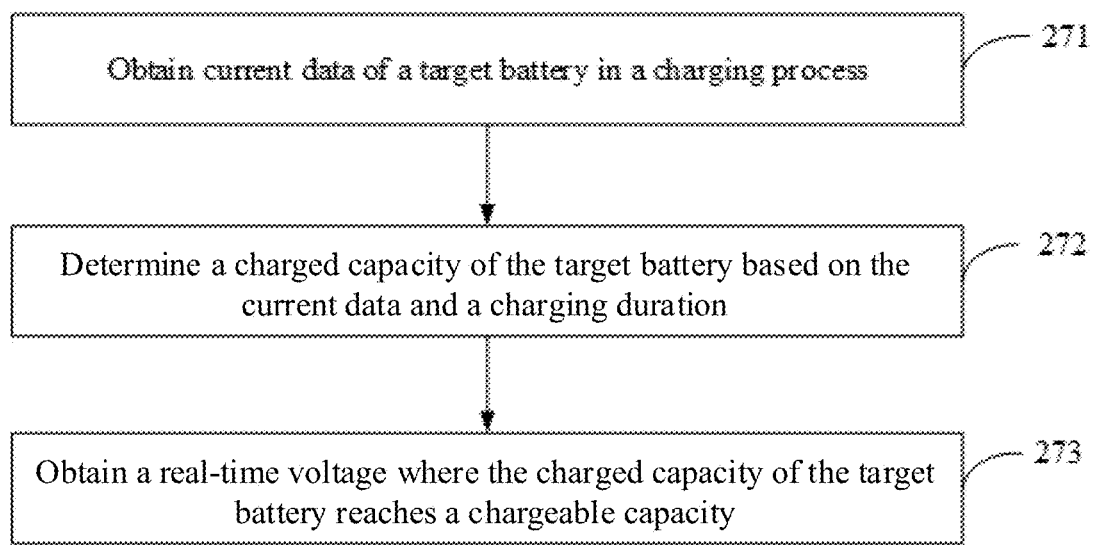
FIG. 7 is a detailed flowchart of step 270 of a charging method according to an embodiment of this application.

In this embodiment, the charge cut-off voltage may be updated as use of the battery:

In an embodiment, as shown in FIG. 7, the real-time voltage of the target battery may be implemented through the steps below:

Step 271: Obtain current data of the target battery obtained in a charging process.

Step 272: Determine a charged capacity of the target battery based on the current data and a charging duration.

For example, the charged capacity of the target battery may be obtained by calculating an integral of the current data and charging duration.

Step 273: Obtain a real-time voltage where the charged capacity of the target battery reaches a chargeable capacity.

In an embodiment, the charged capacity of the target battery is monitored in real time, and the real-time voltage is obtained when the charged capacity reaches the chargeable capacity.

Figure 8:
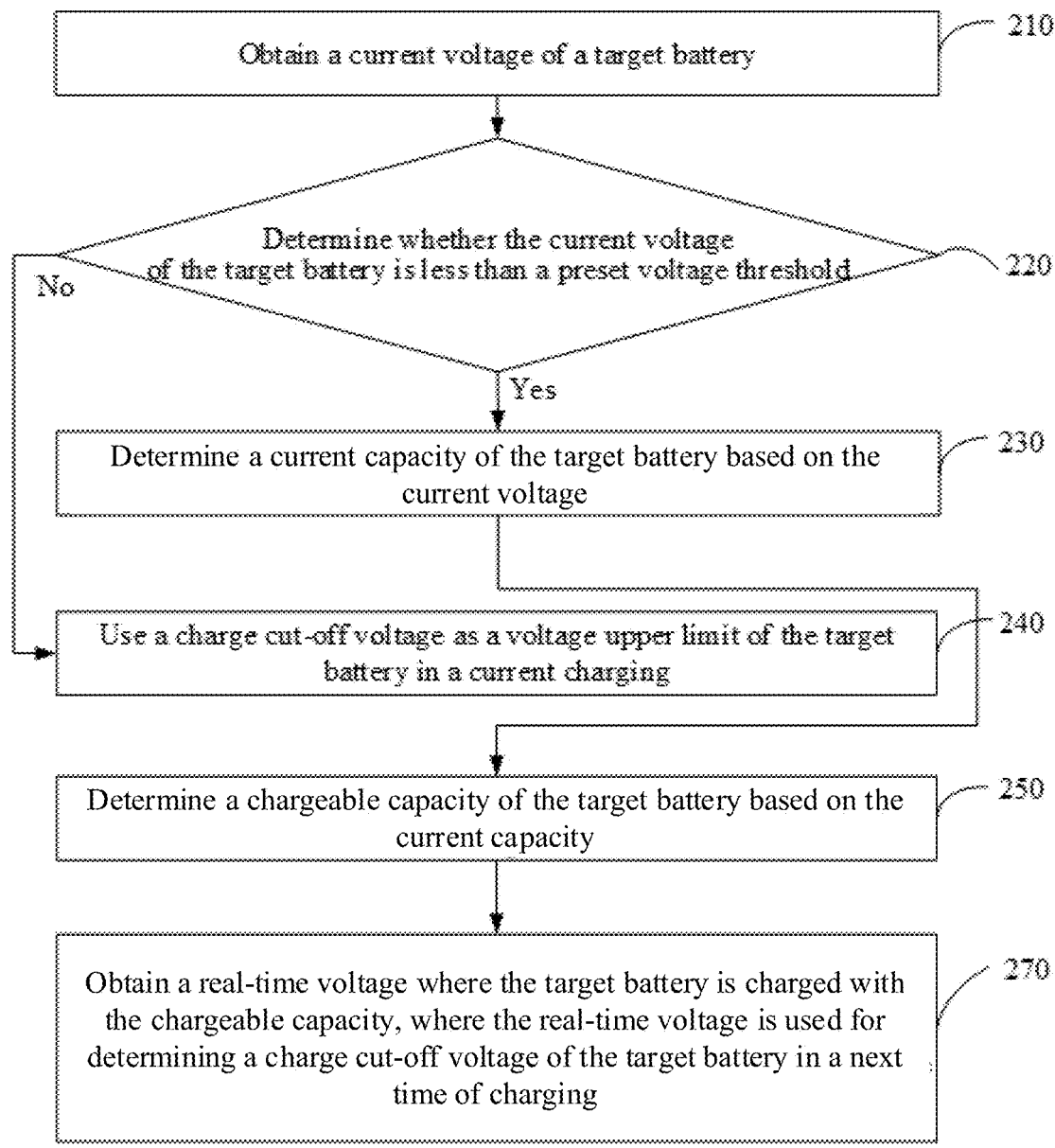
FIG. 8 is another flowchart of a charging method according to an embodiment of this application.

In a case that the current voltage of the target battery where the charging starts is greater than the preset voltage threshold, it is difficult to determine the current capacity of the target battery accurately based on the correspondence between voltages and states of charge, and charging of the target battery may be controlled by using the latest charge cut-off voltage obtained through historical calculation. Based on the foregoing research, as shown in FIG. 8, the charging method in this embodiment may further include step 220 and step 240.

Step 220: Determine whether the current voltage of the target battery is less than the preset voltage threshold.

If the current voltage of the target battery is not less than the preset voltage threshold, step 240 is executed.

Step 240: Use a charge cut-off voltage as a voltage upper limit of the target battery in a current charging.

For example, when the current voltage of the target battery is greater than the preset voltage threshold, step 240 is executed.

The current charging is a first-time charging, because the charge cut-off voltage of the target battery has not been updated, the charge cut-off voltage is an initially set cut-off voltage.

In this embodiment, the initially set cut-off voltage is less than an upper limit protection voltage of the target battery.

When the current charging is an $N^{th}$-time charging, the charge cut-off voltage of the target battery may not have been updated, and thus the current-time charge cut-off voltage may be the initially set cut-off voltage, where N is a positive integer greater than one.

When the current charging is an $N^{th}$-time charging, the charge cut-off voltage of the target battery may have been updated, and thus the current-time charge cut-off voltage may not be the initially set cut-off voltage, and the current-time charge cut-off voltage may be a charge cut-off voltage determined after an $M^{th}$-time charging, where M is a positive integer greater than N, and a value of M may be N−1, or may be a smaller value.

In this embodiment, every charge cut-off voltage of the target battery is the latest updated or the set cut-off voltage.

To avoid a failure in reaching update conditions of the charge cut-off voltage for a long time, a prompt message may be output according to requirements to prompt of performing some processing on the battery, so that the charge cut-off voltage can be updated.

Figure 9:
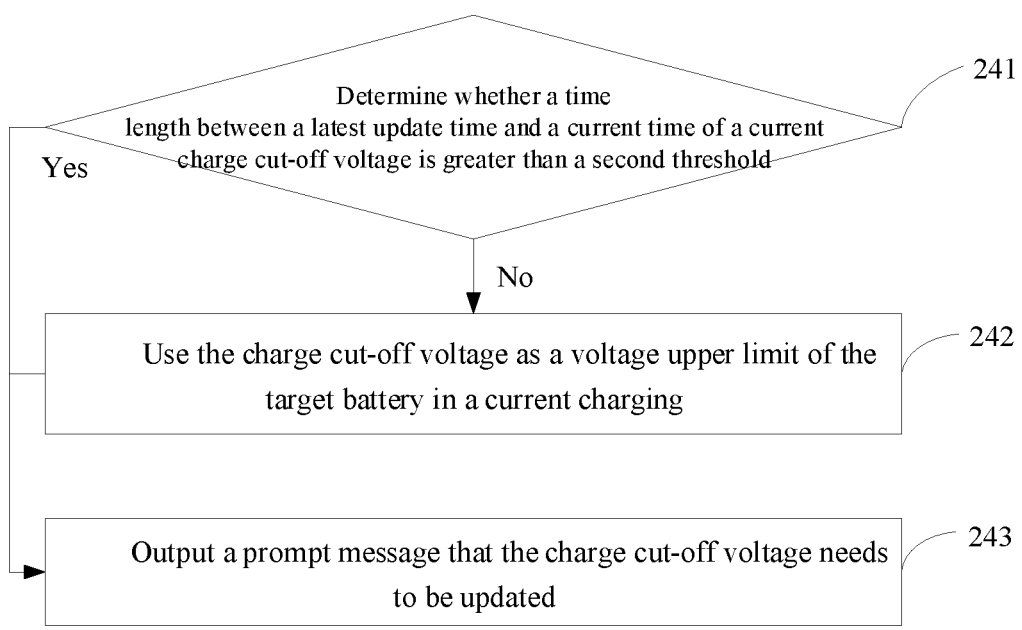
FIG. 9 is a detailed flowchart of step 240 of a charging method according to an embodiment of this application.

When the current voltage of the target battery at the beginning of charging does not meet the update conditions, the latest update time of the charge cut-off voltage may also be determined, as shown in FIG. 9, and in this case, step 240 may include step 241 to step 243 in this case.

Step 241: Determine whether a time length between a latest update time of the current-time charge cut-off voltage and a current time is greater than a second threshold.

If the time length between the latest update time of the current-time charge cut-off voltage and the current time is less than or equal to the second threshold, step 242 is executed. If the time length between the latest update time of the current-time charge cut-off voltage and the current time is greater than the second threshold, step 243 is executed. In an embodiment, if the time length between the latest update time of the current-time charge cut-off voltage and the current time is greater than a second threshold, step 242 and step 243 may alternatively be executed.

The second threshold may be set according to requirements. For example, if the charge cut-off voltage of the target battery needs to be updated once a week at least, the second threshold may be set to five days, six days, or seven days. For example, the charge cut-off voltage of the target battery needs to be updated once a month at least, the second threshold may be set to twenty-five days, twenty-eight days, thirty days, or the like.

Step 242: Use the charge cut-off voltage as a voltage upper limit of the target battery in a current charging.

Step 243: Output a prompt message that the charge cut-off voltage needs to be updated.

In an embodiment, the prompt message may be a voice message, a text message, a flash message, or the like. The prompt message is used to remind a user that the charge cut-off voltage of the target battery needs to be updated. For example, the prompt message may include: the battery of the current vehicle ages and needs to be updated. For another example, the prompt message may include: please use the battery to below X % to facilitate update of the battery: X % may be a state of charge (State of charge, SOC for short) corresponding to the preset threshold voltage.

For example, the prompt message may be output on a trip computer of a vehicle to which the target battery belongs.

For example, the prompt message may be sent to a mobile terminal associated with a vehicle to which the target battery belongs.

The processes of the charging method provided in this embodiment of this application are described below through an example.

A ternary Ni50/graphite lithium-ion battery with a design capacity of C=120 Ah is used as a target battery. The target battery is designed with N/P=1, an upper limit protection voltage of 4.35 V, and a lower limit protection voltage of 2.8 V.

A battery management system (Battery Management System, BMS for short) presets a single battery design capacity as C=120 Ah, and an initial charge cut-off voltage may be set to 4.20 V, and based on the correspondences between voltages and states of charge before and after aging, it is determined that the preset voltage threshold Vx=3.55 V.

For example, the method of obtaining the correspondence between voltages and states of charge of the target battery is as follows:

after the target battery is fully discharged, the target battery is charged at a current of 0.33 C, and left standing for 2 hours every time 6 Ah is charged (the design capacity is 5% SOC), and a voltage of the target voltage after the standing is recorded to obtain an OCV corresponding to the SOC; and these steps are repeated in this way, and OCVs corresponding to different SOCs are obtained, so that the OCV-SOC correspondence is obtained (for details, reference may be made to the example shown in FIG. 6).

For example, when charging starts, it is detected that OCV of the current voltage of the target battery is 3.8 V, it is determined that the current voltage is greater than the preset threshold voltage of 3.55 V, the initially preset charge cut-off voltage V0=4.2 V in the charging remains unchanged, and a charging voltage range is remained between 2.8 V and 4.2 V.

For example, when charging starts, it is detected that the current voltage of the target battery is 3.5 V, the current voltage is less than the preset voltage threshold of 3.55 V: based on the OCV-SOC correspondence in this case, the SOC corresponding to the target battery is 20% SOC, and the current-time capacity corresponding to the battery is 24 Ah: the chargeable capacity obtained through calculation based on the design capacity 120 Ah is 96 Ah, and a capacity of 96 Ah may be charged to the target battery this time: after the capacity of 96 Ah is charged, a real-time voltage V1 at the charging end this time is recorded as 4.23 V. V1 may be used as an updated charge cut-off voltage, and a voltage upper limit in subsequent charging is 4.23 V, that is, the charging voltage range of the target battery is adjusted to between 2.8 V and 4.23 V.

Figure 10:
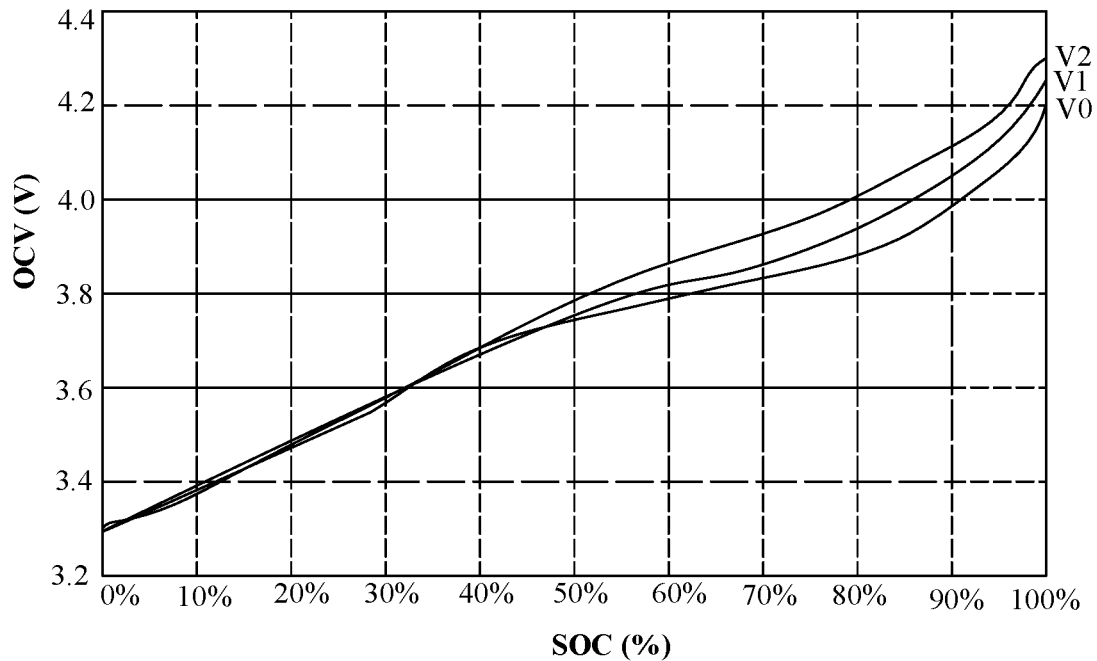
FIG. 10 is a curve diagram of a correspondence between voltages and states of charge with a charge cut-off voltage adjusted in the charging method according to an embodiment of this application.

Further, when charging starts again, it is detected that the current voltage of the target battery is 3.54 V and the current voltage is less than the preset voltage threshold of 3.55 V: based on the OCV-SOC correspondence, the SOC corresponding to the target battery is 30% SOC, and the current-time capacity corresponding to the battery is 36 Ah; the chargeable capacity obtained through calculation based on the design capacity 120 Ah is 84 Ah, and a capacity of 84 Ah may be charged to the target battery this time: after the capacity of 84 Ah is charged, a real-time voltage V2 at the charging end this time is recorded as 4.3 V, V2 may be used as an updated charge cut-off voltage, and a voltage upper limit in subsequent charging is 4.3 V, that is, the charging voltage range of the target battery is adjusted to between 2.8 V and 4.3 V. By analogy, in actual charging, a gradual increase of the charge cut-off voltage is realized by increasing the charge cut-off voltage for multiple times. As shown in FIG. 10, by adjusting the charge cut-off voltage twice, the charge cut-off voltages are V0, V1, and V2 separately, and thus the correspondence between voltages and states of charge may be changed, the SOC of the charged target battery can reach 100% through the changed charge cut-off voltage.

In the charging method provided in this embodiment of this application, because the charge cut-off voltage gradually increases with aging of the battery in use, more lithium is released from the cathode to compensate for the loss of capacity; so as to ensure that the capacity of the battery is unchanged each time and that the capacity of the battery is remained unattenuated, thereby providing a super long service life.

Further, researches show that for common lithium-ion batteries under normal operating conditions, a final failure mode refers to a series of side reactions of active lithium and capacity losses caused by changes in a local crystal structure of a cathode material, with the electrochemical activity of the anode active material graphite basically unchanged. Therefore, in this embodiment of this application, designed N/P of the battery is reduced, and usage of the anode is reduced, so that energy density losses caused by reduction of the initial voltage upper limit may be compensated for, thereby achieving a balance between a long service life and a high energy density.

Based on the same application concept, an embodiment of this application further provides a charging apparatus corresponding to the charging method. The principle of the charging apparatus for resolving the problem is similar to the foregoing embodiment of the charging method, and thus for the implementation of the charging apparatus, reference may be made to the description in the foregoing embodiment of the foregoing method. Repetition is omitted herein.

Figure 11:
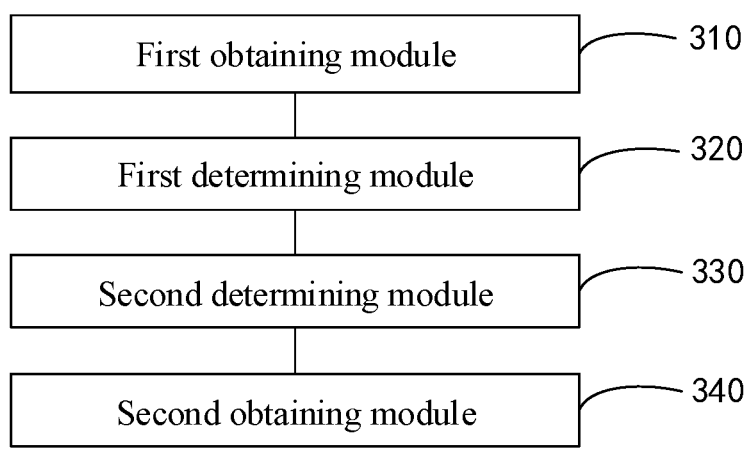
FIG. 11 is block diagram of a functional module of a charging apparatus according to an embodiment of this application.

FIG. 11 is a schematic diagram of a functional module of a charging apparatus according to an embodiment of this application. Various modules of the charging apparatus in this embodiment are configured to execute the various steps of the foregoing method embodiment. The charging apparatus includes: a first obtaining module 310, a first determining module 320, a second determining module 330, and a second obtaining module 340. Functions of the modules are as follows.

The first obtaining module 310 is configured to obtain a current voltage of a target battery:

The first determining module 320 is configured to determine a current capacity of the target battery based on the current voltage.

The second determining module 330 is configured to determine a chargeable capacity of the target battery based on the current capacity.

The second obtaining module 340 is configured to obtain a real-time voltage where the target battery is charged with the chargeable capacity, where the real-time voltage is used for determining a charge cut-off voltage of the target battery in a next charging.

In some embodiments, the first determining module 320 is configured to:
determine a current state of charge of the target battery based on the current voltage and a correspondence between voltages and states of charge of the target battery; and
determine a current capacity of the target battery based on the current state of charge and a design capacity of the target battery.

In some embodiments, the second determining module 330 is configured to:
determine a chargeable capacity of the target battery based on the design capacity and the current capacity of the target battery.

In some embodiments, the second obtaining module 340 is configured to:
obtain current data of the target battery in a charging process:
determine a charged capacity of the target battery based on the current data and a charging duration; and
obtain a real-time voltage where the charged capacity of the target battery reaches a chargeable capacity.

In some embodiments, the first determining module 320 is configured to:
determine whether a time length between a latest update time of a current-time charge cut-off voltage and a current time is greater than a first threshold:
if the time length between the latest update time of the current-time charge cut-off voltage and the current time is greater than the first threshold, determine the current capacity of the target battery based on the current voltage; and
if the time length between the latest update time of the charge cut-off voltage and the current time is less than the first threshold, use the charge cut-off voltage as a voltage upper limit of the target battery in a current charging.

In some embodiments, the charging apparatus according to this embodiment may further include: a charging module, configured to use the charge cut-off voltage as a voltage upper limit of the target battery in current-time charge if the current voltage is greater than a preset voltage threshold, where when the current charging is a first-time charging, the charge cut-off voltage is an initially set cut-off voltage, and when the current charging is an $N^{th}$-time charging, the charge cut-off voltage is an initially set cut-off voltage or a charge cut-off voltage determined after an $M^{th}$-time charging, where N is a positive integer greater than 1, and M is a positive integer less than N.

In some embodiments, the charging module is configured to:
determine whether a time length between a latest update time of the current-time charge cut-off voltage and a current time is greater than a second threshold:
if the time length between the latest update time of the charge cut-off voltage and the current time is less than the second threshold, use the charge cut-off voltage as a voltage upper limit of the target battery in a current charging; and
if the time length between the latest update time of the charge cut-off voltage and the current time is greater than the second threshold, output a prompt message that the charge cut-off voltage needs to be updated.

In some embodiments, a ratio of a negative electrode capacity per unit area to a positive electrode capacity per unit area of the target battery is within a numerical value interval [0.8, 1.1].

Figure 12:
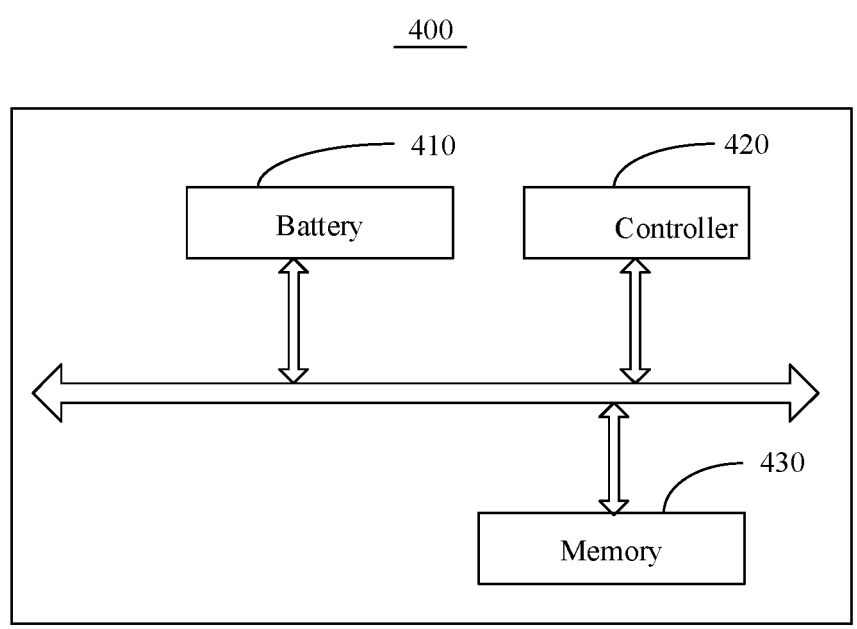
FIG. 12 is a block diagram of a vehicle according to an embodiment of this application.

An embodiment of this application further provides a vehicle. As shown in FIG. 12, the vehicle 400 in this embodiment may include: a battery 410, a controller 420, and a memory 430.

The memory 430 stores a machine-readable instruction capable of being executed by the controller 420. When the battery of the vehicle is charged, the machine-readable instruction is executed by the controller 420 to implement the steps in the charging method provided in the method embodiment 1.

In this embodiment of this application, the controller 420 is a battery management system for realizing management of a battery.

Certainly, the vehicle in this embodiment may also include other components. For example, the vehicle may include an air-conditioning device, an automobile data recorder, a trip computer, or the like. The components included in the vehicle may be specifically set according to functional requirements of the vehicle. This embodiment of this application is not limited to the other components included in the vehicle.

In addition, an embodiment of this application further provides a computer-readable storage medium, where the computer-readable storage medium stores a computer program, and when the computer program is run by a processor, the steps of the charging method in the foregoing method embodiment are executed.

The computer program product for implementing the charging method provided in this embodiment of this application includes a computer-readable storage medium storing program code. An instruction contained in the program code may be used to execute the steps of the charging methods in the foregoing method embodiment. For details, reference may be made to the foregoing method embodiment. Details are not repeated herein.

In some embodiments provided in this application, it should be understood that the disclosed apparatus and method may be implemented in another manner. The apparatus embodiment described above is merely illustrative, for example, the flowcharts and block diagrams in the drawings illustrate probably implemented system architectures, functions and operations of the apparatus, method, and computer program product according to a plurality of embodiments of this application. On this aspect, each block in the flowcharts or the block diagrams may represent part of a module, a program segment or code, and part of the module, the program segment or the code includes one or more executable instructions configured to realize a specified logical function. It should be also noted that in some alternative implementations, the functions marked in the blocks may also be realized in a sequence different from those marked in the accompanying drawings. For example, two continuous blocks may actually be executed substantially concurrently and may also be executed in a reverse sequence sometimes, which is determined by the involved functions. It is further to be noted that each block in the block diagrams and/or the flowcharts and a combination of the blocks in the block diagrams and/or the flowcharts may be implemented by a dedicated hardware-based system configured to execute a specified function or operation or may be implemented by a combination of a special hardware and a computer instruction.

In addition, each functional module in each embodiment of the application may be integrated into an independent part, each module may also independently exist, and two or more than two modules may also be integrated into an independent part.

When realized in form of software functional module and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the application. The foregoing storage medium includes various media capable of storing program codes such as a U disk, a mobile hard disk, a read-only memory (ROM, Read-Only Memory), a random access memory (RAM, Random Access Memory), a magnetic disk, or an optical disk. It should be noted that relational terms such as "first" and "second" are only adopted to distinguish one entity or operation from another entity or operation, and are not necessarily required or implied that there is any such actual relationship or order between these entities or operations. Terms "comprise", "include", or any other variations thereof are intended to cover non-exclusive inclusions, so that processes, methods, articles or devices containing a series of elements not only contain these elements, but also contain other elements which are not clearly listed, or further contain elements which are inherent to these processes, methods, articles or devices. Under the condition of no more limitations, an element defined by the statement "including . . . " does not exclude existence of the same other elements in a process, method, articles or device including the element.

The foregoing descriptions are merely exemplary embodiments of this application, but are not intended to limit this application. Persons skilled in the art understand that this application may have various modifications and variations. Any modification, equivalent replacement, and improvement made without departing from the spirit and principle of this application shall fall within the protection scope of this application. It should be noted that similar reference signs and letters indicate similar items in the following drawings, and therefore once an item is defined in one drawing, it does not need to be further defined and explained in the subsequent drawings.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of this application shall be subject to the scope of protection of the claims.

What is claimed is:

1. A battery charging method, comprising:
    obtaining a current voltage of a target battery;
    determining a current capacity of the target battery based on the current voltage, including:
        determining whether a time length between a latest update time of a current-time charge cut-off voltage and a current time is greater than a threshold; and
        in response to determining that the time length between the latest update time of the current-time charge cut-off voltage and the current time is greater than the threshold, determining the current capacity of the target battery based on the current voltage;
    determining a chargeable capacity of the target battery based on the current capacity;
    obtaining a real-time voltage where the target battery is charged with the chargeable capacity;
    determining a charge cut-off voltage of the target battery based on the real-time voltage; and
    in a next charging of the target battery, controlling to charge the target battery using the determined charge cut-off voltage of the target battery.

2. The method according to claim 1, wherein determining the current capacity of the target battery based on the current voltage further comprises:
    determining a current state of charge of the target battery based on the current voltage and a correspondence between voltages and states of charge of the target battery; and
    determining the current capacity of the target battery based on the current state of charge and a design capacity of the target battery.

3. The method according to claim 1, wherein determining the chargeable capacity of the target battery based on the current capacity comprises:
    determining the chargeable capacity of the target battery based on a design capacity and the current capacity of the target battery.

4. The method according to claim 1, wherein obtaining the real-time voltage where the target battery is charged with the chargeable capacity comprises:
    obtaining current data of the target battery in a charging process;
    determining a charged capacity of the target battery based on the current data and a charging duration; and
    obtaining the real-time voltage where the charged capacity of the target battery reaches the chargeable capacity.

5. The method according to claim 1, wherein the method further comprises:
    when the current voltage is greater than a preset voltage threshold, using the charge cut-off voltage as a voltage upper limit of the target battery in a current charging, wherein when the current charging is a first-time charging, the charge cut-off voltage is an initially set cut-off voltage, and when the current charging is an $N^{th}$-time charging, the charge cut-off voltage is an initially set cut-off voltage, or a charge cut-off voltage obtained by updating after an $M^{th}$-time charging, wherein N is a positive integer greater than 1, and M is a positive integer less than N.

6. The method according to claim 5, wherein the threshold is a first threshold, and using the charge cut-off voltage as the voltage upper limit of the target battery in the current charging comprises:

determining whether the time length between the latest update time of the current-time charge cut-off voltage and the current time is greater than a second threshold;

in response to determining that the time length between the latest update time of the current-time charge cut-off voltage and the current time is less than the second threshold, using the charge cut-off voltage as the voltage upper limit of the target battery in the current charging; and in response to determining that the time length between the latest update time and the current time of the charge cut-off voltage is greater than the second threshold, outputting a prompt message that the charge cut-off voltage needs to be updated.

7. The method according to claim 1, wherein a ratio of a negative electrode capacity per unit area to a positive electrode capacity per unit area of the target battery is within a numerical value interval [0.8, 1.1].

8. A charging apparatus, comprising:
a memory storing a program code; and
a processor configured to execute the program code to:
obtain a current voltage of a target battery;
determine a current capacity of the target battery based on the current voltage, including:
determining whether a time length between a latest update time of a current-time charge cut-off voltage and a current time is greater than a threshold; and
in response to determining that the time length between the latest update time of the current-time charge cut-off voltage and the current time is greater than the threshold, determining the current capacity of the target battery based on the current voltage;
determine a chargeable capacity of the target battery based on the current capacity;
obtain a real-time voltage where the target battery is charged with the chargeable capacity;
determine a charge cut-off voltage of the target battery based on the real-time voltage; and
in a next charging of the target battery, control to charge the target battery using the determined charge cut-off voltage of the target battery.

9. A vehicle, comprising a target battery, a controller, and a memory, wherein the memory stores a machine-readable instruction capable of being executed by the controller; and when the target battery of the vehicle is charged, the machine-readable instruction is executed by the controller to implement the method according to claim 1.

10. A non-transitory computer-readable storage medium, wherein the computer-readable storage medium stores a computer program that, when executed by a processor, cause the processor to implement the steps of the method according to claim 1.

11. A battery charging method, comprising:
obtaining a current voltage of a target battery;
determining a current capacity of the target battery based on the current voltage;
determining a chargeable capacity of the target battery based on the current capacity;
obtaining a real-time voltage where the target battery is charged with the chargeable capacity;
determining a charge cut-off voltage of the target battery based on the real-time voltage;
in a next charging of the target battery, controlling to charge the target battery using the determined charge cut-off voltage of the target battery; and
when the current voltage is greater than a preset voltage threshold, using the charge cut-off voltage as a voltage upper limit of the target battery in a current charging, including:
determining whether a time length between a latest update time of a current-time charge cut-off voltage and a current time is greater than a threshold;
in response to determining that the time length between the latest update time of the current-time charge cut-off voltage and the current time is less than the threshold, using the charge cut-off voltage as the voltage upper limit of the target battery in the current charging; and
in response to determining that the time length between the latest update time and the current time of the charge cut-off voltage is greater than the second threshold, outputting a prompt message that the charge cut-off voltage needs to be updated;
wherein when the current charging is a first-time charging, the charge cut-off voltage is an initially set cut-off voltage, and when the current charging is an $N^{th}$-time charging, the charge cut-off voltage is an initially set cut-off voltage, or a charge cut-off voltage obtained by updating after an $M^{th}$-time charging, wherein N is a positive integer greater than 1, and M is a positive integer less than N.

* * * * *